United States Patent
Wang et al.

(10) Patent No.: US 9,109,956 B2
(45) Date of Patent: Aug. 18, 2015

(54) TEMPERATURE MEASUREMENT CIRCUIT AND TEMPERATURE MEASUREMENT METHOD

(75) Inventors: Ting-Hao Wang, Keelung (TW); Jen-Wei Tsai, Hsinchu (TW); Tsung-Ping Chou, Taichung (TW)

(73) Assignees: GLOBAL UNICHIP CORP., Hsinchu Science Park, Hsinchu (TW); Taiwan Semiconductor Manufacturing Co., Ltd., Hsin-Chu Science Park, Hsin-Chu (TW)

( * ) Notice: Subject to any disclaimer, the term of this patent is extended or adjusted under 35 U.S.C. 154(b) by 131 days.

(21) Appl. No.: 13/434,862

(22) Filed: Mar. 30, 2012

(65) Prior Publication Data
US 2012/0250721 A1 Oct. 4, 2012

(30) Foreign Application Priority Data
Mar. 31, 2011 (TW) .............................. 100111377 A

(51) Int. Cl.
*G01K 15/00* (2006.01)
*G01K 7/00* (2006.01)
*G01K 7/21* (2006.01)

(52) U.S. Cl.
CPC ... *G01K 7/00* (2013.01); *G01K 7/21* (2013.01)

(58) Field of Classification Search
USPC ................................................. 327/512–513
See application file for complete search history.

(56) References Cited

U.S. PATENT DOCUMENTS

| | | | | |
|---|---|---|---|---|
| 6,183,131 | B1 * | 2/2001 | Holloway et al. | 374/172 |
| 6,628,169 | B2 * | 9/2003 | Ivanov et al. | 330/256 |
| 8,317,393 | B2 * | 11/2012 | Chen et al. | 374/170 |
| 2007/0216468 | A1 * | 9/2007 | Duarte | 327/513 |
| 2009/0201067 | A1 * | 8/2009 | Haneda | 327/306 |
| 2010/0259313 | A1 | 10/2010 | Li | |
| 2010/0271246 | A1 * | 10/2010 | Chern et al. | 341/147 |

FOREIGN PATENT DOCUMENTS

| | | |
|---|---|---|
| TW | 200641337 | 12/2006 |
| TW | 200726965 | 7/2007 |
| TW | 200907629 | 2/2009 |
| TW | 201024955 | 7/2010 |

* cited by examiner

*Primary Examiner* — Lisa Caputo
*Assistant Examiner* — Nasir U Ahmed
(74) *Attorney, Agent, or Firm* — Winston Hsu; Scott Margo

(57) ABSTRACT

A temperature measurement circuit includes a sensing unit and a temperature translation unit. The sensing unit is arranged for generating a positive temperature coefficient characteristic and a negative temperature coefficient characteristic according to a temperature. The temperature translation unit is coupled to the sensing unit, and is arranged for generating a measured temperature according to the positive temperature coefficient characteristic and the negative temperature coefficient characteristic.

20 Claims, 7 Drawing Sheets

TEMPERATURE MEASUREMENT CIRCUIT AND TEMPERATURE MEASUREMENT METHOD

BACKGROUND OF THE INVENTION

1. Field of the Invention

The present invention relates to a temperature measurement method and a temperature measurement circuit, and more particularly, to a temperature measurement method and a temperature measurement circuit for compensating measurement errors of a positive temperature coefficient characteristic caused by errors of a reference voltage according to a negative temperature coefficient characteristic.

2. Description of the Prior Art

Temperature measurement is a widely used process. Temperature control is needed not only during a production process of an electronic product, but also to enable finished electronic products to be able to measure their temperature themselves. For example, a computer needs to monitor the temperature of its CPU, and a motor controller needs to get the temperature of its power driver IC.

Most temperature sensors adopt positive temperature coefficient voltage measuring methods, wherein a voltage value is linearly increased as the temperature increases. If there is a voltage error, the measured temperature will become inaccurate such that it is higher than the correct value by a few degrees. For example, if there is a +1% voltage error, the error in the measured temperature may be about 2~4° C. Hence, how to provide an accurate temperature sensor has become one of the most important topics in this field.

SUMMARY OF THE INVENTION

In order to solve the abovementioned problems, it is one of the objectives of the present invention to provide a temperature measurement method and a temperature measurement circuit for compensating measurement errors of a positive coefficient characteristic caused by errors of a reference voltage according to a negative temperature coefficient characteristic.

According to an aspect of the present invention, a temperature measurement circuit which includes a sensing unit and a temperature translation unit is provided. The sensing unit is arranged for generating a positive temperature coefficient characteristic and a negative temperature coefficient characteristic according to a temperature. The temperature translation unit is coupled to the sensing unit, and is arranged for generating a measured temperature according to the positive temperature coefficient characteristic and the negative temperature coefficient characteristic.

According to one embodiment of the present invention, the temperature translation unit further includes a mapping unit, a determining unit, and a calibration unit. The mapping unit is arranged for mapping the positive temperature coefficient characteristic converted digital value onto a first temperature corresponding to the positive temperature coefficient characteristic, and for mapping the negative temperature coefficient characteristic converted digital value onto a second temperature corresponding to the negative temperature coefficient characteristic. The determining unit is coupled to the mapping unit, and is arranged for determining a first coefficient related to the positive temperature coefficient characteristic and a second coefficient related to the second temperature coefficient characteristic according to the first temperature or the second temperature. The calibration unit is coupled to the mapping unit and the determining unit, and is arranged for calculating the measured temperature according to the first temperature, the second temperature, the first coefficient, and the second coefficient.

According to another aspect of the present invention, a temperature measurement method is provided. The method includes the following steps: generating a positive temperature coefficient characteristic and a negative temperature coefficient characteristic according to a temperature; and generating a measured temperature according to the positive temperature coefficient characteristic and the negative temperature coefficient characteristic.

Compared with the prior art, the advantages of the present invention are that the measurement errors of a positive coefficient characteristic caused by errors of a reference voltage can be compensated by using simple operations according to a negative temperature coefficient characteristic, such that the temperature can be accurately calculated.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
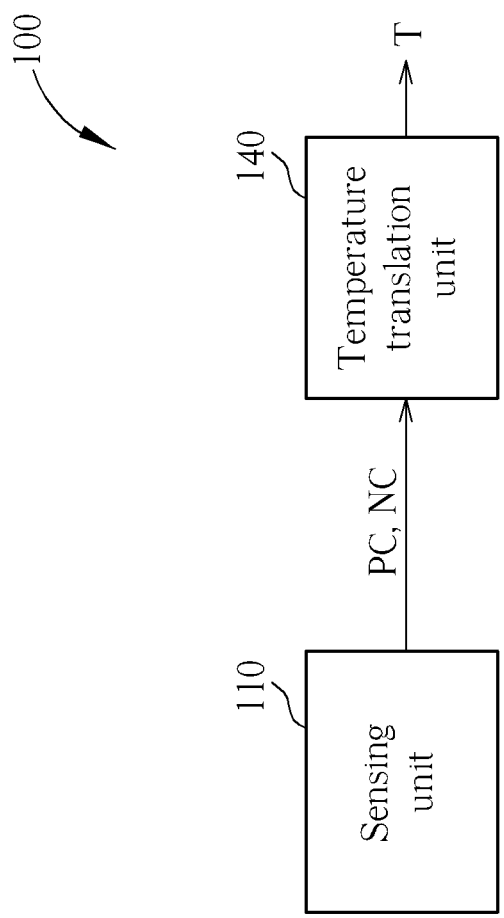
FIG. 1 is a diagram illustrating a temperature measurement circuit according to a first embodiment of the present invention.

Please refer to FIG. 1, which is a diagram illustrating a temperature measurement circuit 100 according to a first embodiment of the present invention. In this embodiment the temperature measurement circuit 100 includes, but is not limited to, a sensing unit 110 and a temperature translation unit 140. The sensing unit 110 is arranged for generating a positive temperature coefficient characteristic PC and a negative temperature coefficient characteristic NC according to a temperature, wherein the positive temperature coefficient characteristic PC can be a positive temperature coefficient voltage ΔVbe or a positive temperature coefficient current, and the negative temperature coefficient characteristic NC can be a negative temperature coefficient voltage Vbe or a negative temperature coefficient current. In this embodiment, the positive temperature coefficient characteristic PC and the negative temperature coefficient characteristic NC are implemented by using the positive temperature coefficient voltage ΔVbe and the negative temperature coefficient voltage Vbe for illustration, respectively. This should not, however, be considered as a limitation of the present invention. Please note that: the voltage value of the negative temperature coefficient voltage Vbe is linearly decreased as the temperature increases, while the voltage value of the positive temperature coefficient voltage ΔVbe is linearly increased as the temperature increases. Please also note that the sensing unit 110 may generate the positive temperature coefficient voltage ΔVbe and the negative temperature coefficient voltage Vbe by using the base-emitter voltage difference of a bipolar junction transistor (BJT), but the present invention is not limited to this only. The principle of using the base-emitter voltage difference of a bipolar junction transistor (BJT) to generate the positive temperature coefficient voltage ΔVbe and the negative temperature coefficient voltage Vbe is well-known to those skilled in the art, and further description is omitted here for brevity. Furthermore, the temperature translation unit 140 is coupled to the sensing unit 110, and is arranged for generating a measured temperature T according to the positive temperature coefficient characteristic PC and the negative temperature coefficient characteristic NC. Please note that any mechanism or circuit that can be used for generating the measured temperature T according to the positive temperature coefficient characteristic PC and the negative temperature coefficient characteristic NC also belongs to the scope of the present invention.

Figure 2:
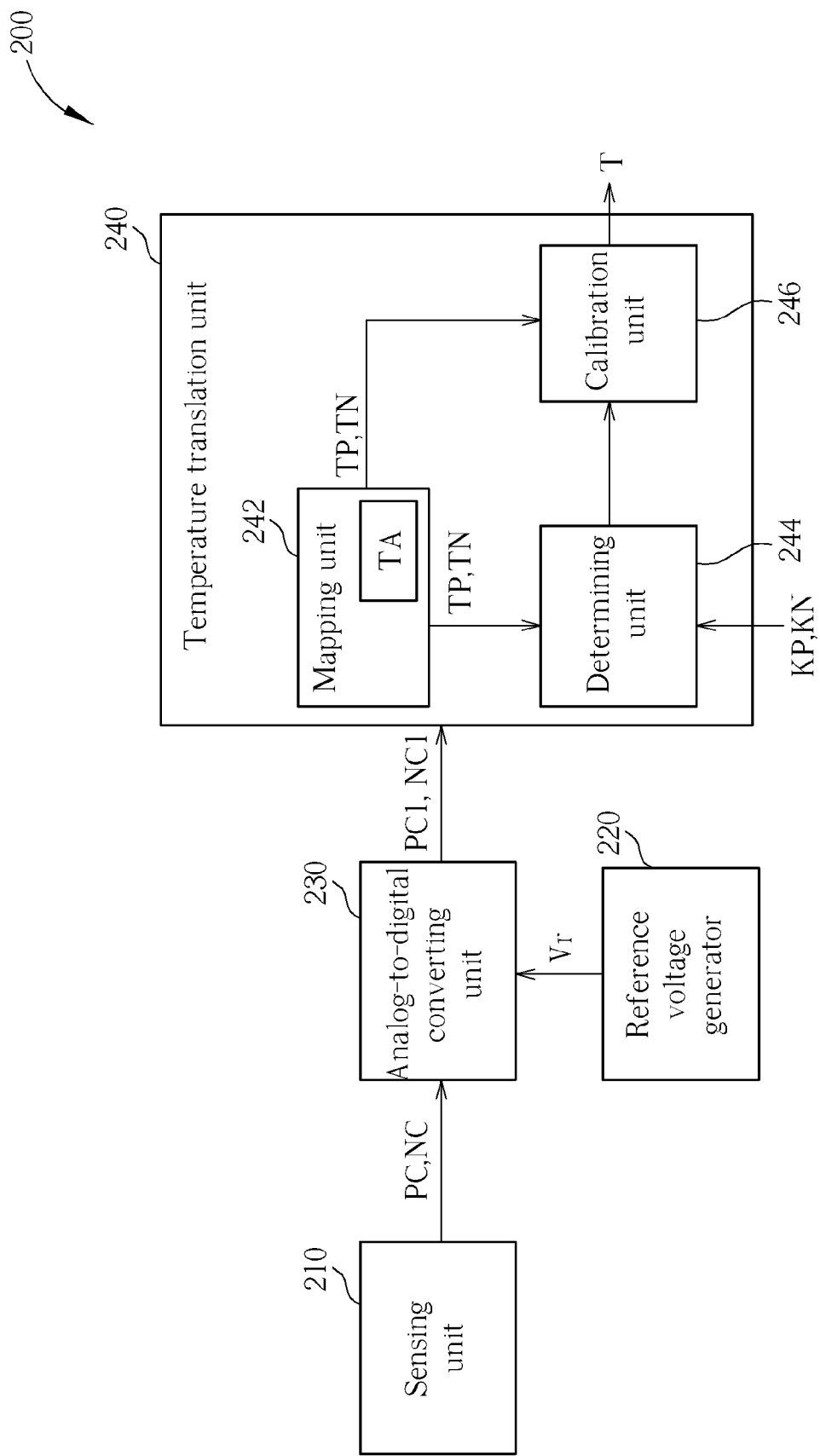
FIG. 2 is a diagram illustrating a temperature measurement circuit according to a second embodiment of the present invention.

Please refer to FIG. 2. FIG. 2 is a diagram illustrating a temperature measurement circuit 200 according to a second embodiment of the present invention. The architecture of the temperature measurement circuit 200 shown in FIG. 2 is similar to that of the temperature measurement circuit 100 shown in FIG. 1, and the difference between them is that: the temperature translation unit 240 of the temperature measurement circuit 200 further includes a mapping unit 242, a determining unit 244, and a calibration unit 246; additionally, the temperature measurement circuit 200 further includes a reference voltage generator 220 and an analog-to-digital converting unit 230. The reference voltage generator 220 is arranged for generating a reference voltage Vr, wherein the reference voltage Vr can be a temperature invariant reference voltage. In this embodiment, the reference voltage generator 220 may be implemented by a bandgap reference circuit, but the present invention is no limited to this only. The process by which the bandgap reference circuit generates a temperature invariant reference voltage is well-known to those skilled in the art, and further description is omitted here for brevity. In addition, the analog-to-digital converting unit 230 is coupled to the sensing unit 110 and the reference voltage generator 220, and is arranged for converting the positive temperature coefficient characteristic PC into a digital value PC1 and converting the negative temperature coefficient characteristic NC into another digital value NC1 according to the reference voltage Vr. Please note that: in this embodiment, the analog-to-digital converting unit 230 can be implemented by an analog-to-digital converter, but this should not be considered as a limitation of the present invention. The positive temperature coefficient characteristic converted digital value PC1 and the negative temperature coefficient characteristic converted digital value NC1 generated by the analog-to-digital converting unit 230 can facilitate the follow-up processes. Furthermore, the process by which the analog-to-digital converting unit 230 generates the positive temperature coefficient characteristic converted digital value PC1 and the negative temperature coefficient characteristic converted digital value NC1 according to the positive temperature coefficient voltage ΔVbe, the negative temperature coefficient voltage Vbe, and the reference voltage Vr is well-known to those skilled in the art, and further description is omitted here for brevity.

In this embodiment, the mapping unit 242 is arranged for mapping the positive temperature coefficient characteristic converted digital value PC1 onto a first temperature TP, and for mapping the negative temperature coefficient characteristic converted digital value NC1 onto a second temperature TN. For example, the mapping unit 242 may include a mapping table TA, wherein the mapping table TA is arranged for storing the corresponding relationship between the positive temperature coefficient characteristic converted digital value PC1 and the first temperature TP and the corresponding relationship between the negative temperature coefficient characteristic converted digital value NC1 and the second temperature TN. For example, when the positive temperature coefficient characteristic PC is equal to 70 mV, the first temperature TP corresponds to −45° C.; when the positive temperature coefficient characteristic PC is equal to 80 mV, the first temperature TP corresponds to −15° C. As a result, the mapping unit 242 is capable of mapping the positive temperature coefficient characteristic converted digital value PC1 onto the first temperature TP by using the mapping table TA (combined with a linear interpolation method). Similarly, the mapping unit 242 is capable of mapping the negative temperature coefficient characteristic converted digital value NC1 onto the second temperature TN by using the mapping table TA (combined with a linear interpolation method). In addition, the determining unit 244 is coupled to the mapping unit 242, and is arranged for determining a first coefficient KP related to the positive temperature coefficient characteristic PC and a second coefficient KN related to the negative temperature coefficient characteristic NC according to the first temperature TP or the second temperature TN. What calls for special attention is that: the determining unit 244 can also be used for determining the first coefficient KP related to the positive temperature coefficient characteristic PC and the second coefficient KN related to the negative temperature coefficient characteristic NC according to an average value of the first temperature TP and the second temperature TN. For example, if only one first coefficient KP and only one second coefficient KN exist, the determining unit 244 can directly adopt the first coefficient KP and the second coefficient KN to obtain the result. In another embodiment of the present invention, it is assumed that there are a plurality of first coefficients KP and a plurality of second coefficients KN, such as for every 10° C. there is a corresponding first coefficient KP and a corresponding second coefficient KN. For example, there is a corresponding first coefficient KP0 and a corresponding second coefficient KN0 when the temperature is equal to 0° C.; there is a corresponding first coefficient KP10 and a corresponding second coefficient KN10 when the temperature is equal to 10° C.; there is a corresponding first coefficient KP20 and a corresponding second coefficient KN20 when the temperature is equal to 20° C., etc. If the first temperature TP mapped by the mapping unit 242 is equal to 58° C. and the second temperature TN mapped by the mapping unit 242 is 48° C., the determining unit 244 may decide to adopt the first coefficient KP60 and the second coefficient KN60 to obtain results since the first temperature TP (58° C.) is close to 60° C., or the determining unit 244 may decide to adopt the first coefficient KP50 and the second coefficient KN50 to obtain results since the second temperature TN (48° C.) is close to 50° C., or the determining unit 244 may decide to adopt the first coefficient KP50 and the second coefficient KN50 to obtain results since the average value (53° C.) of the first temperature TP (58° C.) and the second temperature TN (48° C.) is close to 50° C. The calibration unit 246 is coupled to the mapping unit 242 and the determining unit 244, and is arranged for calculating the measured temperature T according to the first temperature TP, the second temperature TN, the first coefficient KP, and the second coefficient KN. The calculation unit 246 determines the measured temperature according to the following equation (1):

$$T=(KP \times TP+KN \times TN)/(KP+KN) \quad (1);$$

Wherein T represents the measured temperature, TP represents the first temperature, TN represents the second temperature, KP represents the first coefficient, and KN represents the second coefficient.

Figure 3:
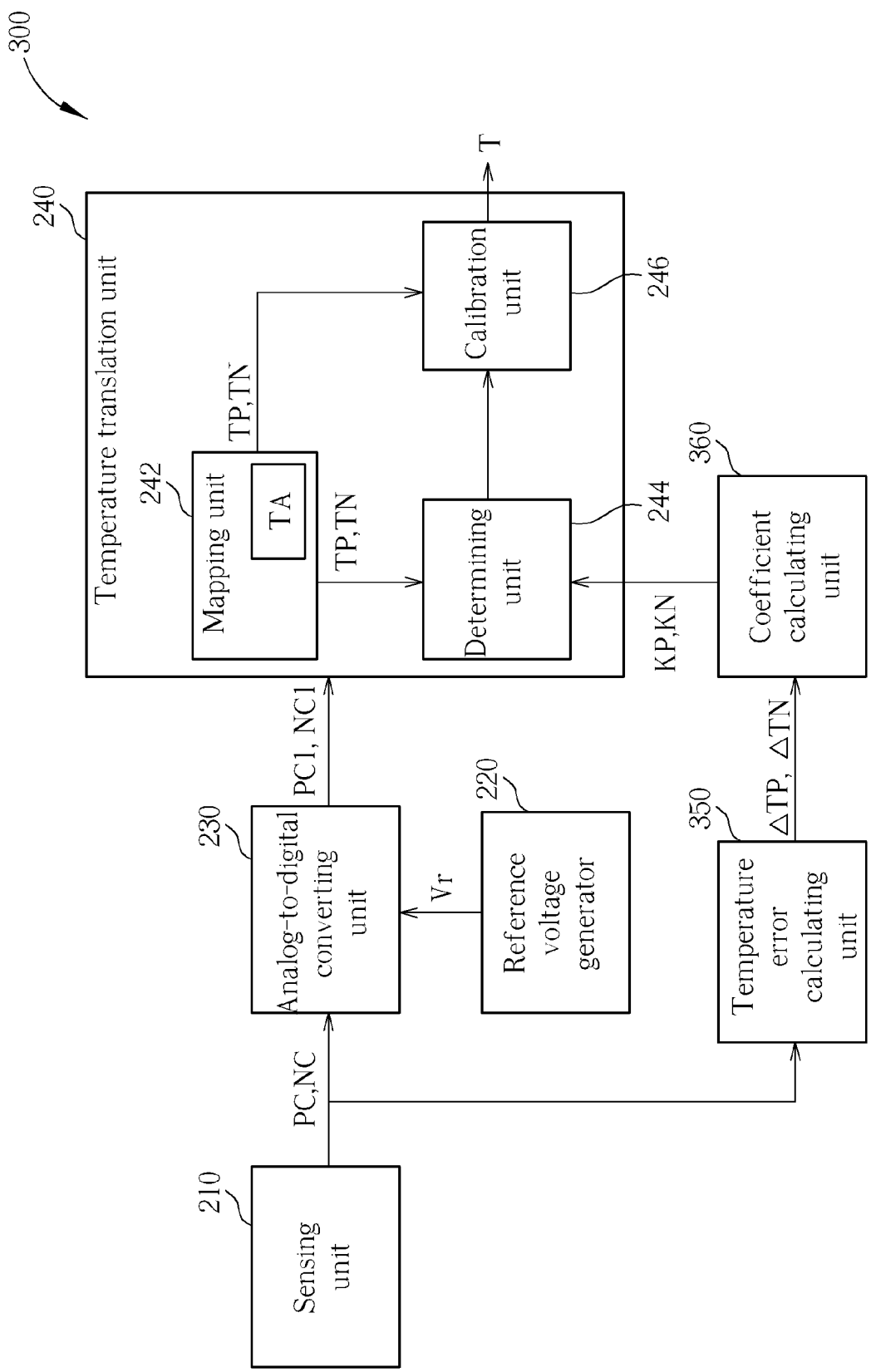
FIG. 3 is a diagram illustrating a temperature measurement circuit according to a third embodiment of the present invention.

Please refer to FIG. 3, which is a diagram illustrating a temperature measurement circuit 300 according to a third embodiment of the present invention. The architecture of the temperature measurement circuit 300 shown in FIG. 3 is similar to that of the temperature measurement circuit 200 shown in FIG. 2, and the difference between them is that: the temperature measurement circuit 300 shown in FIG. 3 further includes a temperature error calculating unit 350 and a coefficient calculating unit 360. The temperature error calculating unit 350 is arranged for calculating a positive temperature error ΔTP related to the positive temperature coefficient characteristic PC and a negative temperature error ΔTN related to the negative temperature coefficient characteristic NC. The coefficient calculating unit 360 is coupled to the temperature error calculating unit 350, and is arranged for calculating the first coefficient KP and the second coefficient KN according to the positive temperature error ΔTP and the negative temperature error ΔTN. Please note that the coefficient calculating unit 360 may determine the first coefficient and the second coefficient according to the following equation (2):

$$KP \times \Delta TP+KN \times \Delta TN=0 \quad (2);$$

wherein ΔTP represents the positive temperature error, ΔTN represents the negative temperature error, KP represents the first coefficient, and KN represents the second coefficient.

Figure 4A:
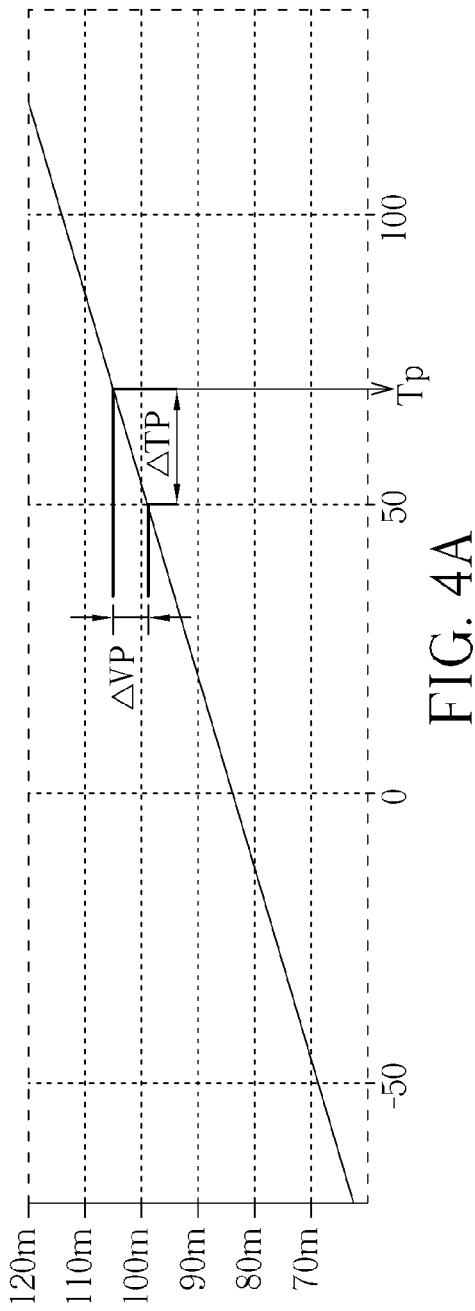
FIG. 4A is a diagram showing a positive temperature coefficient voltage.
Figure 4B:
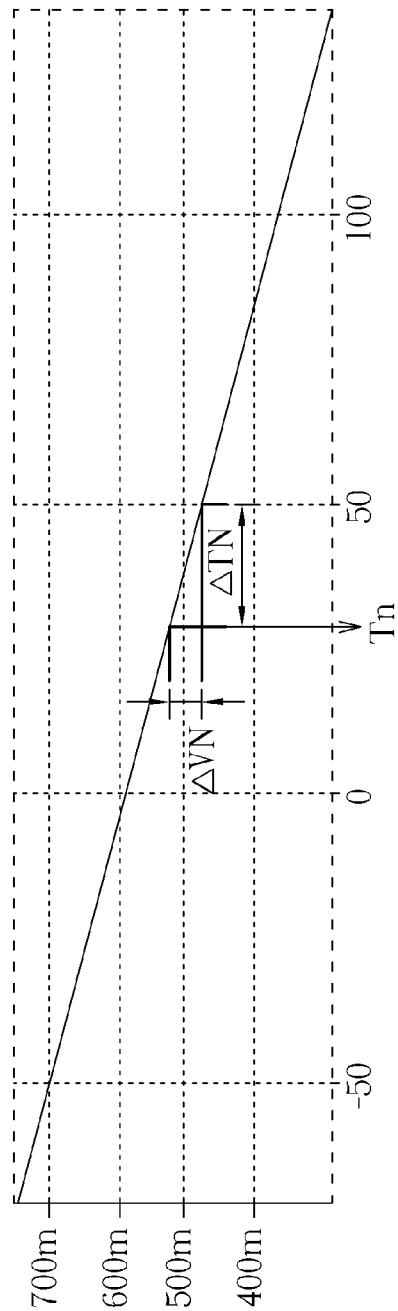
FIG. 4B is a diagram showing a negative temperature coefficient voltage.

In the following description, several examples are cited for illustrating the operations of calculating the first coefficient KP and the second coefficient KN in the present invention. Please refer to FIG. 4A together with FIG. 4B, wherein FIG. 4A is a diagram showing a positive temperature coefficient voltage and FIG. 4B is a diagram showing a negative temperature coefficient voltage. Assume that the positive temperature coefficient voltage is equal to 98 mV when the temperature is equal to 50° C. As shown in FIG. 4A, the temperature corresponding to the positive temperature coefficient voltage is equal to 50° C. If, however, there is a 1% error in the reference voltage Vr, the measured value of the positive temperature coefficient voltage will be increased by 1% (ΔVP). Due to the error ΔVP, the temperature error calculating unit 350 will calculate that the first temperature TP corresponding to the positive temperature coefficient voltage shown in FIG. 4A is equal to 53° C. At this time, the positive temperature error ΔTP is 3 (53−50=3). Similarly, assume that the negative temperature coefficient voltage is equal to 490 mV when the temperature is equal to 50° C. As shown in FIG. 4B, the temperature corresponding to the negative temperature coefficient voltage is equal to 50° C. If, however, there is a 1% error in the reference voltage Vr, the measured value of the negative temperature coefficient voltage will be increased by 1% (ΔVN). Due to the error ΔVN, the temperature error calculating unit 350 will calculate that the second temperature TN corresponding to the negative temperature coefficient voltage shown in FIG. 4B is equal to 48° C. At this time, the negative temperature error ΔTN is −2 (48−50=−2). Therefore, the coefficient calculating unit 360 will calculate the ratio between the first coefficient KP50 and the second coefficient KN50 to be 2:3.

Please note that: in this embodiment, the coefficient calculating unit 360 only has one first coefficient KP50 and one second coefficient KN50. For this reason, the determining unit 244 can directly adopt the first coefficient KP50 and the second coefficient KN50 to obtain the result. The calibration unit 246 can then determine the measured temperature T according to the first temperature TP, the second temperature TN, the first coefficient KP50, and the second coefficient KN50. For example, if the temperature is equal to 50° C., the first temperature TP mapped onto the positive temperature coefficient characteristic converted digital value PC1 by the mapping unit 242 is equal to 53° C., and the second temperature TN mapped onto the negative temperature coefficient characteristic converted digital value NC1 is equal to 48° C. Therefore, the calibration unit 246 can determine the measured temperature T according to the abovementioned equation (1): T=(2×53° C.+3×48° C.)/(2+3)=50° C. In another case, if the temperature is equal to 120° C., the first temperature TP mapped onto the positive temperature coefficient characteristic converted digital value PC1 by the mapping unit 242 is equal to 124° C., and the second temperature TN mapped onto the negative temperature coefficient characteristic converted digital value NC1 is equal to 118.5° C. Therefore, the calibration unit 246 can determine the measured temperature T according to the abovementioned equation (1): T=(2×124° C.+3×118.5° C.)/(2+3)=120.7° C. No matter how the measured temperature changes, only one first coefficient KP and one second coefficient KN are required in order to obtain a relatively accurate temperature.

Please note that the abovementioned embodiment which adopts the positive temperature coefficient voltage and the negative temperature coefficient voltage to calculate the first coefficient KP and the second coefficient KN is merely a practicable embodiment of the present invention, and in no way should be considered to be a limitation of the scope of the present invention. In other embodiments of the present invention, the positive temperature coefficient current and the negative temperature coefficient current can be used for calculating the first coefficient KP and the second coefficient KN. Furthermore, the first coefficient KP50 and the second coefficient KN50 are calculated when the temperature is equal to 50° C., but this is presented merely to illustrate practicable designs of the present invention. By reference to the method of calculating the first coefficient KP50 and the second coefficient KN50 mentioned above, the first coefficient KP0 and the second coefficient KN0 can be calculated when the temperature is equal to 0° C., the first coefficient KP10 and the second coefficient KN10 can be calculated when the temperature is equal to 10° C., the first coefficient KP20 and the second coefficient KN20 can be calculated when the temperature is equal to 20° C., etc. The determining unit 242 may determine the suitable first coefficient KP and second coefficient KN according to the first temperature TP and the second temperature TN. Hence, any mechanism or circuit that can be used for generating the measured temperature T according to the first temperature TP, the second temperature TN, the first coefficient KP, and the second coefficient KN should belong to the scope of the present invention. In addition, the equation (1) and the equation (2) are simple operations. Only simple operations are required for compensating measurement errors of the positive temperature coefficient voltage caused by errors of the reference voltage according to the negative temperature coefficient voltage, such that the measured temperature T can be accurately determined.

Figure 5:
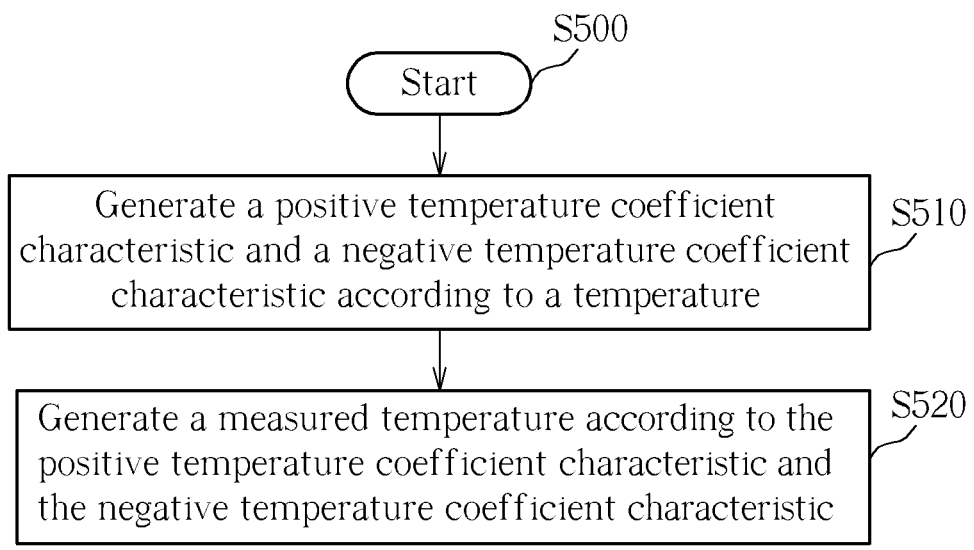
FIG. 5 is a flowchart illustrating a temperature measurement method according to a first exemplary embodiment of the present invention.

Please refer to FIG. 5, which is a flowchart illustrating a temperature measurement method according to a first exemplary embodiment of the present invention. Please note that the following steps are not limited to be performed according to the exact sequence shown in FIG. 5 if a roughly identical result can be obtained. The method may include, but is not limited to, the following steps:

Step S500: Start;

Step S510: Generate a positive temperature coefficient characteristic and a negative temperature coefficient characteristic according to a temperature;

Step S520: Generate a measured temperature according to the positive temperature coefficient characteristic and the negative temperature coefficient characteristic.

Those skilled in the art can readily understand the details and appropriate modifications of each element by combining the steps shown in FIG. 5 and the elements of the temperature measurement circuit 100 shown in FIG. 1 stated above; further description is omitted here for brevity.

Figure 6:
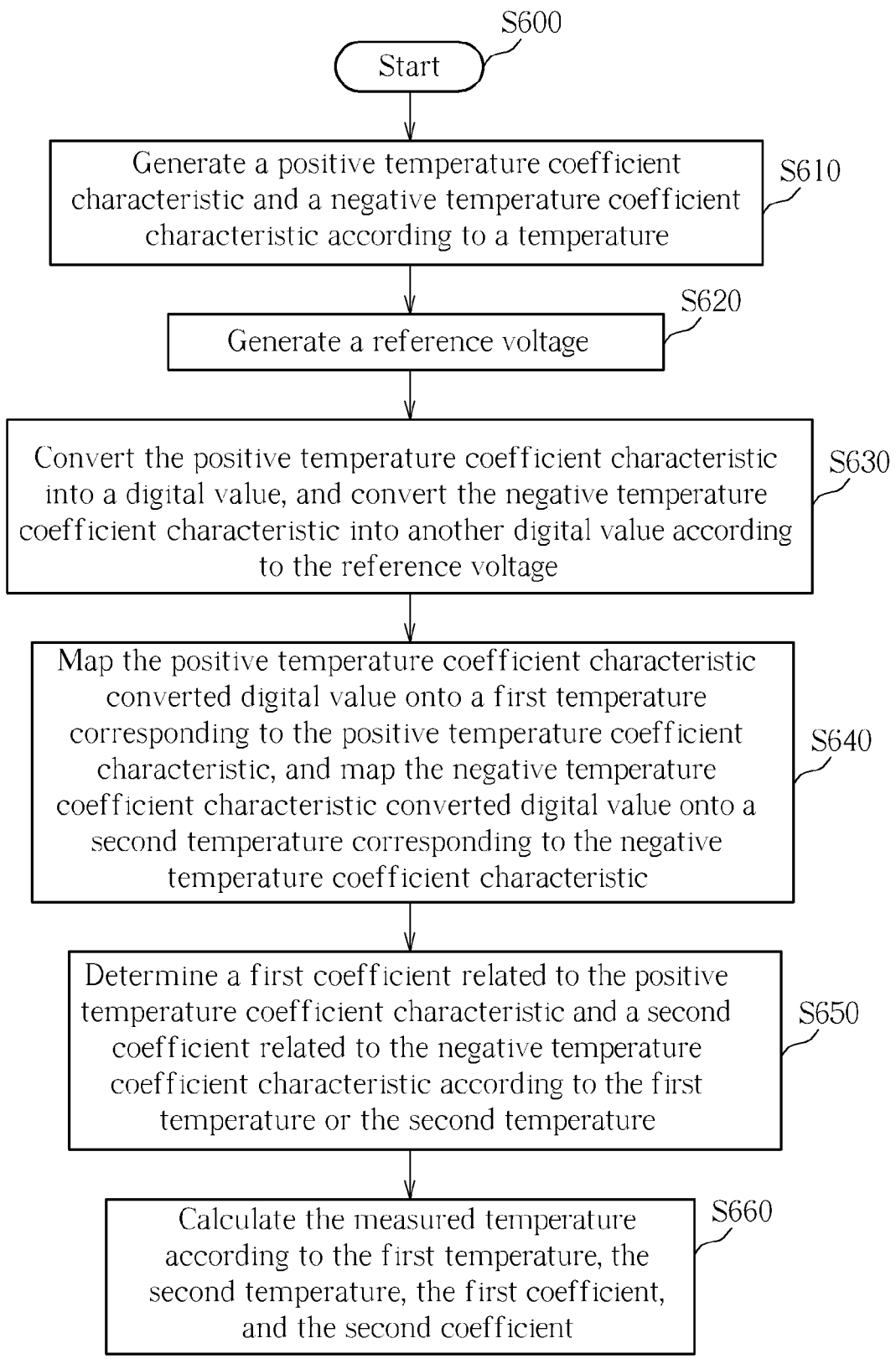
FIG. 6 is a flowchart illustrating a temperature measurement method according to a second exemplary embodiment of the present invention.

Please refer to FIG. 6, which is a flowchart illustrating a temperature measurement method according to a second exemplary embodiment of the present invention. Please note that the following steps are not limited to be performed according to the exact sequence shown in FIG. 6 if a roughly identical result can be obtained. The method may include, but is not limited to, the following steps:

Step S600: Start;

Step S610: Generate a positive temperature coefficient characteristic and a negative temperature coefficient characteristic according to a temperature;

Step S620: Generate a reference voltage;

Step S630: Convert the positive temperature coefficient characteristic into a digital value, and convert the negative temperature coefficient characteristic into another digital value according to the reference voltage;

Step S640: Map the positive temperature coefficient characteristic converted digital value onto a first temperature corresponding to the positive temperature coefficient characteristic, and map the negative temperature coefficient characteristic converted digital value onto a second temperature corresponding to the negative temperature coefficient characteristic;

Step S650: Determine a first coefficient related to the positive temperature coefficient characteristic and a second coefficient related to the negative temperature coefficient characteristic according to the first temperature or the second temperature;

Step S660: Calculate the measured temperature according to the first temperature, the second temperature, the first coefficient, and the second coefficient.

Those skilled in the art can readily understand the details and appropriate modifications to each element by combining the steps shown in FIG. 6 and the elements of the temperature measurement circuit shown in FIG. 2 stated above; further description is omitted here for brevity.

Figure 7:
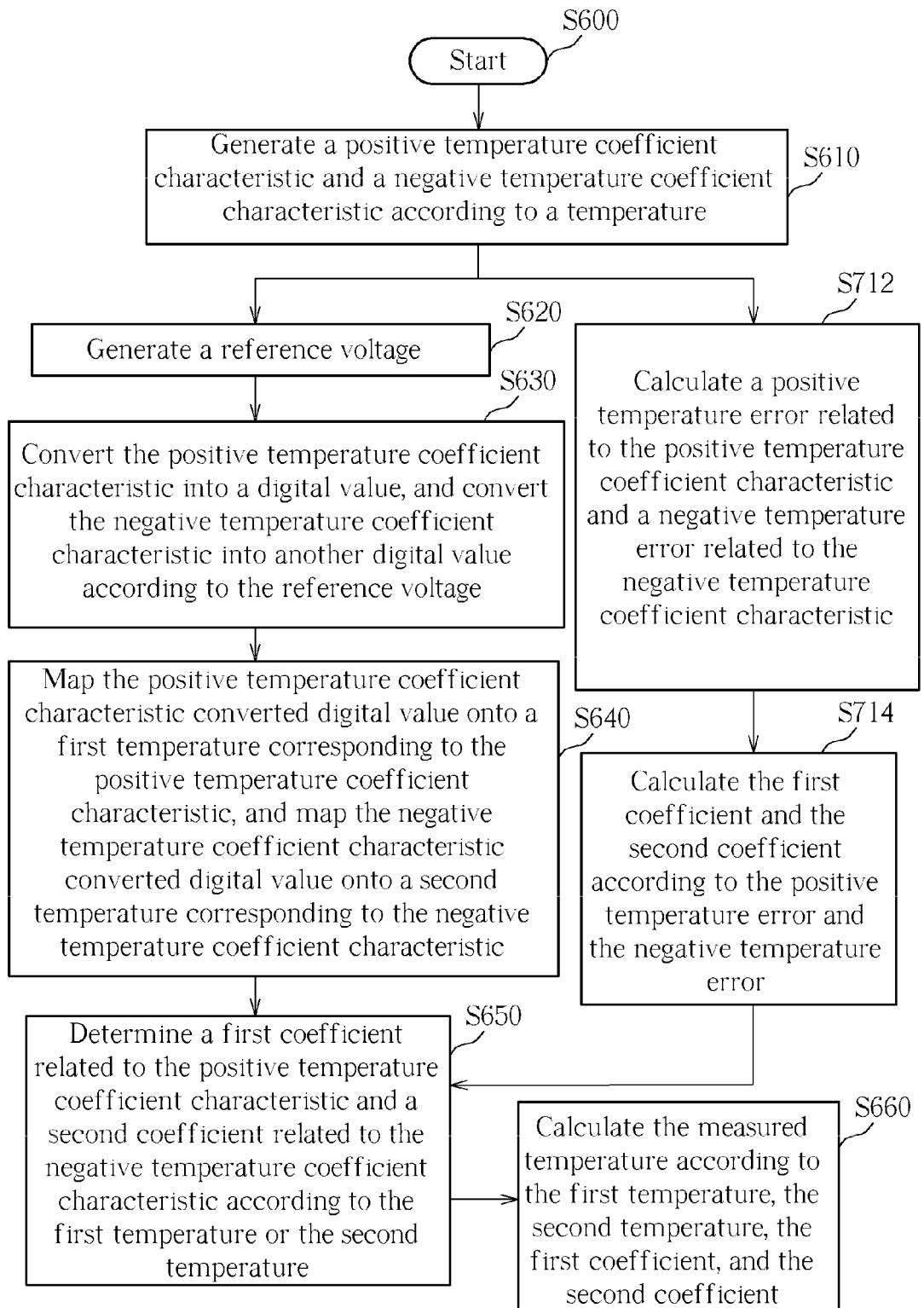
FIG. 7 is a flowchart illustrating a temperature measurement method according to a third exemplary embodiment of the present invention.

Please refer to FIG. 7, which is a flowchart illustrating a temperature measurement method according to a third exemplary embodiment of the present invention. Please note that the following steps are not limited to be performed according to the exact sequence shown in FIG. 7 if a roughly identical result can be obtained. The method may include, but is not limited to, the following steps:

Step S600: Start;

Step S610: Generate a positive temperature coefficient characteristic and a negative temperature coefficient characteristic according to a temperature;

Step S712: Calculate a positive temperature error related to the positive temperature coefficient characteristic and a negative temperature error related to the negative temperature coefficient characteristic;

Step S714: Calculate the first coefficient and the second coefficient according to the positive temperature error and the negative temperature error;

Step S620: Generate a reference voltage;

Step S630: Convert the positive temperature coefficient characteristic into a digital value, and convert the negative temperature coefficient characteristic into another digital value according to the reference voltage;

Step S640: Map the positive temperature coefficient characteristic converted digital value onto a first temperature corresponding to the positive temperature coefficient characteristic, and map the negative temperature coefficient characteristic converted digital value onto a second temperature corresponding to the negative temperature coefficient characteristic;

Step S650: Determine a first coefficient related to the positive temperature coefficient characteristic and a second coefficient related to the negative temperature coefficient characteristic according to the first temperature or the second temperature;

Step S660: Calculate the measured temperature according to the first temperature, the second temperature, the first coefficient, and the second coefficient.

Those skilled in the art can readily understand the details and appropriate modifications to each element by combining the steps shown in FIG. 7 and the elements of the temperature measurement circuit shown in FIG. 3 stated above; further description is omitted here for brevity.

Please note that the steps of the abovementioned flowcharts are merely practicable embodiments of the present invention, and in no way should be considered to be limitations of the scope of the present invention. These methods can include other intermediate steps or several steps can be merged into a single step without departing from the spirit of the present invention.

The abovementioned embodiments are presented merely to illustrate practicable designs of the present invention. In summary, a temperature measurement method and a temperature measurement circuit for compensating measurement errors of a positive coefficient characteristic caused by errors of a reference voltage according to a negative temperature coefficient characteristic are provided in the present invention. By using only the first coefficient and the second coefficient under a certain temperature, the measured temperature can be accurately measured. In addition, another advantage of the present invention is that relatively precise temperatures can be calculated through simple operations.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A temperature measurement circuit, comprising:
   a sensing unit, arranged for generating a positive temperature coefficient characteristic and a negative temperature coefficient characteristic according to a temperature;
   a temperature translation unit, coupled to the sensing unit, arranged for directly calculating a measured temperature according to digital values of the positive temperature coefficient characteristic and the negative temperature coefficient characteristic without comparing the digital values; and
   a mapping unit, arranged for mapping the positive temperature coefficient characteristic converted digital value onto a first temperature, and for mapping the negative temperature coefficient characteristic converted digital value onto a second temperature.

2. The temperature measurement circuit according to claim 1, further comprising:
   a reference voltage generator, arranged for generating a reference voltage; and
   an analog-to-digital converting unit, coupled to the sensing unit and the reference voltage generator, arranged for converting the positive temperature coefficient characteristic into a digital value, and converting the negative temperature coefficient characteristic into another digital value according to the reference voltage.

3. The temperature measurement circuit according to claim 2, wherein the reference voltage generator comprises a bandgap reference circuit, for generating a temperature invariant reference voltage.

4. The temperature measurement circuit according to claim 1, wherein the sensing unit generates the positive temperature coefficient characteristic and the negative temperature coefficient characteristic by using a bipolar junction transistor (BJT).

5. The temperature measurement circuit according to claim 1, wherein the positive temperature coefficient characteristic comprises a positive temperature coefficient voltage or a positive temperature coefficient current, and the negative temperature coefficient characteristic comprises a negative temperature coefficient voltage or a negative temperature coefficient current.

6. A temperature measurement circuit, comprising:
   a sensing unit, arranged for generating a positive temperature coefficient characteristic and a negative temperature coefficient characteristic according to a temperature;
   a temperature translation unit, coupled to the sensing unit, arranged for calculating digital values of the positive temperature coefficient characteristic and the negative temperature coefficient characteristic, to obtain a measured temperature;
   a mapping unit, arranged for mapping the positive temperature coefficient characteristic converted digital value onto a first temperature, and for mapping the negative temperature coefficient characteristic converted digital value onto a second temperature;
   a determining unit, coupled to the mapping unit, arranged for determining a first coefficient related to the positive temperature coefficient characteristic and a second coefficient related to the negative temperature coefficient characteristic according to the first temperature or the second temperature; and
   a calibration unit, coupled to the mapping unit and the determining unit, arranged for calculating the measured temperature according to the first temperature, the second temperature, the first coefficient, and the second coefficient.

7. The temperature measurement circuit according to claim 6, wherein the determining unit is further arranged for determining the first coefficient related to the positive temperature coefficient characteristic and the second coefficient related to the second temperature coefficient characteristic according to an average value of the first temperature and the second temperature.

8. The temperature measurement circuit according to claim 6, further comprising:
   a temperature error calculating unit, arranged for calculating a positive temperature error related to the positive temperature coefficient characteristic and a negative temperature error related to the negative temperature coefficient characteristic; and
   a coefficient calculating unit, coupled to the temperature error calculating unit, arranged for calculating the first coefficient and the second coefficient according to the positive temperature error and the negative temperature error.

9. The temperature measurement circuit according to claim 8, wherein the coefficient calculating unit determines the first coefficient and the second coefficient according to the following equation:

$$KP \times \Delta TP + KN \times \Delta TN = 0;$$

wherein $\Delta TP$ represents the positive temperature error, $\Delta TN$ represents the negative temperature error, KP represents the first coefficient, and KN represents the second coefficient.

10. The temperature measurement circuit according to claim 9, wherein the calibration unit determines the measured temperature according to the following equation:

$$T = (KP \times TP + KN \times TN)/(KP + KN);$$

wherein T represents the measured temperature, TP represents the first temperature, TN represents the second temperature, KP represents the first coefficient, and KN represents the second coefficient.

11. A temperature measurement method, comprising:
   generating a positive temperature coefficient characteristic and a negative temperature coefficient characteristic according to a temperature;
   directly calculating a measured temperature according to digital values of the positive temperature coefficient characteristic and the negative temperature coefficient characteristic without comparing the digital values; and
   mapping the positive temperature coefficient characteristic converted digital value onto a first temperature corresponding to the positive temperature coefficient characteristic, and mapping the negative temperature coefficient characteristic converted digital value onto a second temperature corresponding to the negative temperature coefficient characteristic.

12. The temperature measurement method according to claim 11, further comprising:
   generating a reference voltage; and
   converting the positive temperature coefficient characteristic into a digital value, and converting the negative temperature coefficient characteristic into another digital value according to the reference voltage.

13. The temperature measurement method according to claim 12, wherein the reference voltage is a temperature invariant reference voltage.

14. The temperature measurement method according to claim 11, wherein the positive temperature coefficient characteristic and the negative temperature coefficient characteristic are generated by using a bipolar junction transistor (BJT).

15. The temperature measurement method according to claim 11, wherein the positive temperature coefficient characteristic comprises a positive temperature coefficient voltage or a positive temperature coefficient current, and the negative temperature coefficient characteristic comprises a negative temperature coefficient voltage or a negative temperature coefficient current.

16. A temperature measurement method, comprising:
   generating a positive temperature coefficient characteristic and a negative temperature coefficient characteristic according to a temperature;
   calculating digital values of the positive temperature coefficient characteristic and the negative temperature coefficient characteristic, to obtain a measured temperature;
   mapping the positive temperature coefficient characteristic converted digital value onto a first temperature corresponding to the positive temperature coefficient characteristic, and mapping the negative temperature coefficient characteristic converted digital value onto a second temperature corresponding to the negative temperature coefficient characteristic;
   determining a first coefficient related to the positive temperature coefficient characteristic and a second coefficient related to the negative temperature coefficient characteristic according to the first temperature or the second temperature; and
   calculating the measured temperature according to the first temperature, the second temperature, the first coefficient, and the second coefficient.

17. The temperature measurement method according to claim 16, wherein the step of determining the first coefficient related to the positive temperature coefficient characteristic and the second coefficient related to the negative temperature coefficient characteristic according to the first temperature or the second temperature further comprises:
   determining the first coefficient related to the positive temperature coefficient characteristic and the second coefficient related to the second temperature coefficient characteristic according to an average value of the first temperature and the second temperature.

18. The temperature measurement method according to claim 16, wherein the step of generating the measured temperature according to the positive temperature coefficient characteristic and the negative temperature coefficient characteristic further comprises:
   calculating a positive temperature error related to the positive temperature coefficient characteristic and a negative temperature error related to the negative temperature coefficient characteristic; and
   calculating the first coefficient and the second coefficient according to the positive temperature error and the negative temperature error.

19. The temperature measurement method according to claim 18, wherein in the step of calculating the first coefficient and the second coefficient according to the positive temperature error and the negative temperature error, the first coefficient and the second coefficient are determined according to the following equation:

$$KP \times \Delta TP + KN \times \Delta TN = 0;$$

wherein $\Delta TP$ represents the positive temperature error, $\Delta TN$ represents the negative temperature error, KP represents the first coefficient, and KN represents the second coefficient.

20. The temperature measurement method according to claim 19, wherein in the step of calculating the measured temperature according to the first temperature, the second temperature, the first coefficient, and the second coefficient, the measured temperature is determined according to the following equation:

$$T = (KP \times TP + KN \times TN)/(KP + KN);$$

wherein T represents the measured temperature, TP represents the first temperature, TN represents the second temperature, KP represents the first coefficient, and KN represents the second coefficient.

* * * * *